Patented Nov. 21, 1944

2,363,020

UNITED STATES PATENT OFFICE 2,363,020

METHOD FOR CHEMICAL DEMINERALIZATION OF SEA WATER

Clair Raymond Spealman, United States Navy

No Drawing. Application June 8, 1943, Serial No. 490,053

6 Claims. (Cl. 210—23)

(Granted under the act of March 3, 1883, as amended April 30, 1928; 370 O. G. 757)

This invention relates to an improved method for chemical demineralization of sea water and has for an object to provide a method for removing the salts and minerals in sea water so as to convert it into drinking water.

A further object of this invention is to provide an efficient method for demineralizing sea water so as to produce drinking water of sufficient purity that it can be safely used without any health hazard.

A still further object of this invention is to provide an improved method for making drinking water out of sea water, which method is suitable for practical application on life boats and life rafts.

Still a further object of this invention is to provide a chemical method for converting sea water into drinking water wherein the volume of drinking water produced will be manifold the volume of the chemicals used in the method.

Still a further object of this invention is to provide a method for demineralization of sea water which includes the almost complete removal of sodium and other ions, for it has been found that excess sodium ions in water have a deleterious effect on the human system in causing undue dehydration and cloudy swelling of the renal parenchyma.

With the foregoing and other objects in view, the invention consists in the compounds, combination and method hereinafter set forth.

The method of this invention is so simple that it can be easily utilized on a life raft or life boat, thus making it possible for shipwrecked personnel to have a much greater volume of drinking water available than would be possible were they to attempt to carry fresh water itself on the life raft or boat. One volume of the chemicals utilized in this invention will produce a theoretical maximum of about 17 volumes of drinking water; any smaller yield will depend on the nature of the manipulation of the chemicals.

Theory of the procedure or process

The general principle involved is the addition of a sufficient quantity of a suitable base to precipitate the anion present followed by the addition of a sufficient quantity of a suitable acid to precipitate the cations present. The method actually used is a special case of this general principle in that both the base ($Ag_2O$) and acid (uric acid) used as precipitants are practically insoluble; this fact obviates the necessity of accurate measurement of these reagents.

Chloride ion removal

Chloride ion is removed as the insoluble silver chloride. The silver compound employed to give the free silver ion ($Ag+$) must be relatively insoluble (to limit toxicity). Furthermore, the silver compound must be a base, i. e., a hydroxide or a carbonate or have basic properties, e. g., colloidal silver.

*Silver oxide.*—This substance seems to have the greatest advantages of the preparations tested. It is relatively simple to prepare and is the quickest for the removal of the chloride ion from sea water. It is also very stable.

$$Ag_2O + 2NaCl + H_2O \rightarrow 2AgCl + 2NaOH$$

Magnesium ion removal

Magnesium ion is removed as the insoluble magnesium hydroxide and carbonate. The reaction illustrated in the following equations proceed when the solution becomes alkaline as it does on the addition of silver oxide to remove the chloride ion; hence, no separate reagent is required for the removal of magnesium ion.

$$H_2O + MgCl_2 + Ag_2O \rightarrow Mg(OH)_2 + 2AgCl$$
$$Ag_2CO_3 + MgCl_2 \rightarrow 2AgCl + MgCO_3$$

Calcium ion removal

Like magnesium ion, calcium ion is removed incidentally in the removal of other substances. Part of it is removed as the insoluble carbonate and part as the insoluble oxide.

$$CaCl_2 + Ag_2O \rightarrow CaO + 2AgCl$$
$$CaCl_2 + Ag_2CO_3 \rightarrow CaCO_3 + 2AgCl$$

Sodium ion removal

In the experiments to date, the sodium ions have been removed by the addition of uric acid to form the insoluble sodium urate. Other cations which may be present are also removed partially or completely as insoluble urates.

$$C_5H_4N_4O_3 + 2NaCl \rightarrow Na_2(C_5H_2N_4O_3) + HCl$$

Other acids having properties similar to uric acid do exist, but because of the immediate necessity of a method for obtaining potable water from sea water, and since the war emergency limits the procuring of other compounds that have possibilities, all energies have been devoted to the urate method.

It is necessary to remove most of the sodium ions for the reason that if these are ingested they must be excreted by the kidneys and this promotes dehydration.

Performance of the procedure or process

For example, in carrying out this process, to 1000 mls. of sea water are added 55.6 gms. of silver oxide. Greater or lesser quantities of silver oxide may be added with the result that greater or lesser quantities of chloride ions are removed, and with the result that greater or lesser quantities of uric acid will be required than the amount hereinafter specified. A suitable container will, of course, be provided which can be stoppered.

The container is then shaken at frequent intervals for about 30 minutes and then filtered into a second suitable container, (or the precipitate otherwise removed) yielding about 930 mls. of water. Then 63.9 gms. of uric acid is added to the filtered water in the second container and the second container is shaken at intervals for a time period of about one hour. This mixture is again filtered into a third container (or the precipitate otherwise removed) yielding about 750 mls. of water which is now suitable for drinking, about 81% of the solid matter of the sea water having been removed by this method.

Thus, the general principle involved in removal of the sodium and chloride ion is the addition of a sufficient quantity of a suitable base to precipitate the chloride ions followed by the addition of a sufficient quantity of a suitable acid to precipitate the sodium and certain other cations. The method actually used is a special case of this general principle, in that both the base (silver oxide) and the acid (uric acid) used as precipitants are practically insoluble. The chemical reaction in the order in which they are carried out may be illustrated as follows:

(a) $2Na^+ + 2Cl^- + Ag_2O + H_2O =$
$2Na^+ + 2OH^- + 2AgCl(\downarrow)$
(b) $Na^+OH^- + $ uric acid $= Na-$urate$(\downarrow) + H_2O$ Thus, it will be seen that instead of attempting to provide kegs of drinking water for use on life boats and life rafts, it is only necessary to provide suitable small containers and filtering apparatus together with prepared packages preferably in measured amounts of the necessary chemicals. The containers and packages may be made in the sizes and weights above mentioned or in multiples thereof, so that when it is necessary to prepare drinking water on a life boat, the first container will be filled with sea water and then prepared packages containing the proper amounts in proportion of silver oxide will be emptied into the first container and the contents shaken or agitated.

Then the contents of the first container is poured through a filter funnel into the second container into which is emptied a package containing a proper amount of uric acid and then after the reaction has gone on for an hour while being shaken frequently, the second container is poured through a filter funnel into the storage container for the drinking water. Outside of the two additional containers and filter funnels together with filter paper or other necessary filtering material, the volume of drinking water that can be produced by this method has a theoretical maximum of about 17 times the volume of the packaged chemicals necessary in the process, thus making it possible to provide a far greater potential quantity of drinking water with this process than would be possible if the drinking water itself were to be placed on the life boat or life raft. The actual volume ratio achieved so far is approximately 10 to 1. However, packaging experts can undoubtedly increase this ratio considerably.

This process or method is particularly valuable in the case or rubber life boats from wrecked aircraft where the weight and volume of drinking water that could be carried for emergency use on the life boat or raft is small as compared with the amount of water that can be produced with the chemicals and necessary equipment used in this process.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

What is claimed is:

1. A two-step method of converting sea water into drinking water consisting in first agitating a quantity of sea water with a quantity of silver oxide and then, after filtering the agitated water, adding a quantity of uric acid thereto and after agitating it again, filtering it, thereby providing drinking water, the proportions of the chemicals to a liter of sea water being approximately 55.6 gms. of silver oxide, the amount of uric acid being approximately 63.9 gms.

2. A method of converting sea water into drinking water consisting of taking a volume of sea water, adding silver oxide in sufficient quantity to remove the majority of the chloride ions, shaking the above mixture until the silver oxide added has reacted completely with the chloride ion, removing the precipitate from the above mixture, adding uric acid to the resulting clear water in a quantity equal to the molecular equivalent of the silver oxide added, shaking the resulting mixture until the majority of sodium ions have been removed from the solution, removing the precipitate from the mixture, thereby providing drinkable water.

3. A method of converting sea water into drinking water consisting in taking approximately a liter of sea water, adding approximately 55.6 gms. of silver oxide thereto, shaking the resulting mixture for approximately 30 minutes, passing same through a filter, adding approximately 63.9 gms. of uric acid to the filtered water, shaking the resulting mixture for approximately one hour, and filtering the same, thereby providing drinkable water.

4. A two-step method of converting sea water into drinking water consisting of first agitating a quantity of sea water with a quantity of silver oxide sufficient to precipitate more than half the chloride ion present in the quantity of sea water taken, and then after filtering the above mixture, adding a quantity of uric acid approximately equal to the molecular equivalent of silver oxide previously added, and after agitating the resulting mixture, filtering it, thereby providing drinking water.

5. A method of converting sea water into drinking water consisting in taking a volume of sea water, adding silver oxide in the proportion of more than 46.4 gms. per liter of sea water taken, filtering the same, adding uric acid to the filtered water in an amount equal to the molecular equivalent of silver oxide added, filtering the same, thereby providing drinkable water.

6. A method of converting sea water into drinking water, including the addition of sufficient silver oxide to remove most of the chloride, magnesium, and calcium ions followed by the addition of sufficient uric acid to remove most of the sodium, potassium and other cations.

CLAIR RAYMOND SPEALMAN.